(12) United States Patent
Uesaka et al.

(10) Patent No.: US 7,911,570 B2
(45) Date of Patent: Mar. 22, 2011

(54) LIQUID CRYSTAL DISPLAY DEVICE

(75) Inventors: Tetsuya Uesaka, Yokohama (JP); Satoru Ikeda, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 420 days.

(21) Appl. No.: 12/094,295

(22) PCT Filed: Nov. 2, 2006

(86) PCT No.: PCT/JP2006/322406
§ 371 (c)(1),
(2), (4) Date: May 20, 2008

(87) PCT Pub. No.: WO2007/086179
PCT Pub. Date: Aug. 2, 2007

(65) Prior Publication Data
US 2009/0185111 A1 Jul. 23, 2009

(30) Foreign Application Priority Data

Jan. 25, 2006 (JP) .................................. 2006-016263

(51) Int. Cl.
G02F 1/1335 (2006.01)
G02F 1/1347 (2006.01)
(52) U.S. Cl. ............ 349/119; 349/75; 349/117; 349/120
(58) Field of Classification Search .................... 349/75, 349/117, 119, 120
See application file for complete search history.

(56) References Cited

U.S. PATENT DOCUMENTS

| 5,460,748 A | 10/1995 | Mazaki et al. |
| 5,635,105 A | 6/1997 | Kawata et al. |
| 5,646,703 A | 7/1997 | Kamada et al. |
| 6,628,359 B1 | 9/2003 | Terashita et al. |

(Continued)

FOREIGN PATENT DOCUMENTS

EP 0926534 A2 6/1999
(Continued)

OTHER PUBLICATIONS

Destrade, C. et al., "Disc-Like Mesogens: A Classification," Molecular Crystals and Liquid Crystals, vol. 71, Nos. 1 and 2, pp. 111-135, 1981.

(Continued)

*Primary Examiner* — Michael H Caley
(74) *Attorney, Agent, or Firm* — Panitch Schwarze Belisario & Nadel LLP

(57) ABSTRACT

The present invention provides a liquid crystal display device comprising at least: a backlight; a polarizer; a first optically anisotropic layer with a retardation of 210 to 300 nm at a wavelength of 550 nm; a second optically anisotropic layer with a retardation of 50 to 140 nm at a wavelength of 550 nm; a third optically anisotropic layer with negative optical anisotropy; a liquid crystal cell comprising upper and lower substrates facing each other and a liquid crystal layer sandwiched between the upper and lower substrates; a fourth optically anisotropic layer with a retardation of 50 to 140 nm at a wavelength of 550 nm; a first optically anisotropic layer with a retardation of 210 to 300 nm at a wavelength of 550 nm; and a polarizer, arranged in piles in this order from the backlight, the second optically anisotropic layer comprising at least a liquid crystal film with a fixed nematic hybrid liquid crystal orientation structure. The liquid crystal display device provides bright images and is high in contrast and less in viewing angle dependency.

14 Claims, 12 Drawing Sheets

U.S. PATENT DOCUMENTS

| | | | |
|---|---|---|---|
| 6,630,973 | B1 | 10/2003 | Matsuoka et al. |
| 6,693,693 | B1 * | 2/2004 | Okita et al. ............... 349/119 |
| 6,903,789 | B1 * | 6/2005 | Cutler et al. ............... 349/119 |
| 2003/0164921 | A1 | 9/2003 | Uesaka et al. |
| 2003/0169391 | A1 | 9/2003 | Uchida et al. |
| 2004/0119914 | A1 | 6/2004 | Tsuchiya |

FOREIGN PATENT DOCUMENTS

| | | |
|---|---|---|
| EP | 0928984 A2 | 7/1999 |
| JP | 06347742 A | 12/1994 |
| JP | 0827284 A | 1/1996 |
| JP | 2640083 B2 | 5/1997 |
| JP | 11194325 A | 7/1999 |
| JP | 11194371 A | 7/1999 |
| JP | 11352328 A | 12/1999 |
| JP | 2000111914 A | 4/2000 |
| JP | 200235185 A | 8/2000 |
| JP | 2001004837 A | 1/2001 |
| JP | 2001166144 A | 6/2001 |
| JP | 2002031717 A | 1/2002 |
| JP | 2003262869 A | 9/2003 |
| JP | 2004157454 A | 6/2004 |

OTHER PUBLICATIONS

"The Chemistry of Liquid Crystals," Quarterly Chemistry Survey, No. 22, Chapter 5 and Chapter 10, Section 2, 1994 (edited by Japan Chemical Society).

Kohne, B. et al., "Hexa-O-alkanoyl-scyllo-inosite, die ersten discotischen Flussigkristalle aus alicyclischen, gesattigten Verbindungen," Angewandte Chemie, vol. 96, pp. 70-71, 1984.

Lehn, J. et al., "Tubular Mesophases: Liquid Crystals consisting of Macrocyclic Molecules," Journal of the Chemical Society, Chemical Communications, No. 24, pp. 1794-1796, 1985.

Zhang, J. et al., "Liquid Crystals Based on Shape-Persistent Macrocyclic Mesogens," Journal of the American Chemical Society, vol. 116, pp. 2655-2656, 1994.

* cited by examiner

LIQUID CRYSTAL DISPLAY DEVICE

CROSS-REFERENCE TO RELATED APPLICATIONS

This application is a Section 371 of International Application No. PCT/JP2006/322406, filed Nov. 2, 2006, which was published in the Japanese language on Aug. 2, 2007, under International Publication No. WO 2007/086179 A1 and the disclosure of which is incorporated herein by reference.

BACKGROUND OF THE INVENTION

The present invention relates to liquid crystal display devices or transflective liquid crystal display devices having both reflective and transmissive mode, used for office automation (OA) equipment such as word processors and personal computers, mobile information terminals such as personal digital assistants and mobile telephones, or camcorders equipped with a liquid crystal monitor.

Liquid crystal display devices are classified broadly into those capable of displaying images in a reflective mode, those capable of displaying images in transmissive mode, and those of capable of displaying images in both reflective and transmissive modes and have been used widely as display devices for lap top computers or televisions because of their low-profile and light weight characteristics. In particular, the transflective liquid crystal display devices use a display mode capable of displaying images both in reflective and transmissive modes and thus can display images in a well-lighted area or a dark area and reduce the electric power consumption by switching to either one of the reflective and transmissive modes, depending on the brightness in the environment. Therefore, the transflective liquid crystal display devices have been used for various mobile information terminals.

The transmissive, reflective and transflective liquid crystal display devices in particular in the transmissive mode can not avoid problems concerning viewing angle such as reduced display contrast, changes in display color and reversed gradation occurring when viewed obliquely because of the refractive index anisotropy of the liquid crystal molecules and thus has been demanded to be improved in these regards.

For a transmissive liquid crystal display device using a TN mode (twisted angle of liquid crystal is 90 degrees), a method for solving these problems has been proposed and practically used wherein optical compensation films are disposed between the liquid crystal cell and each of the upper and lower polarizers.

For example, there are known some structures wherein an optical compensation film composed of a hybrid-aligned discotic liquid crystal or a nematic hybrid-aligned liquid crystalline polymer compound is disposed between the liquid crystal cell and each of the upper and lower polarizers (Patent Document Nos. 1 to 3 below).

For a transflective liquid crystal display device, it is necessary to dispose a circular polarizer comprising one or a plurality of uniaxially retardation film in displaying principle and a polarizer above or below the liquid crystal cell for the transmissive mode.

In order to enlarge the viewing angle of the transflective liquid crystal device in the transmissive mode, a method has been proposed and practically used wherein an optical compensation film aligned in a nematic hybrid orientation is used as a circular polarizer to be disposed between the liquid crystal cell and the backlight (see Patent Document Nos. 4 and 5).

(1) Patent Document No. 1: Japanese Patent Publication No. 2640083
(2) Patent Document No. 2: Japanese Laid-Open Publication No. 11-194325
(3) Patent Document No. 3: Japanese Laid-Open Publication No. 11-194371
(4) Patent Document No. 4: Japanese Laid-Open Publication No. 2002-31717
(5) Patent Document No. 5: Japanese Laid-Open Publication No. 2004-157454

BRIEF SUMMARY OF THE INVENTION

However, the foregoing methods can not solve the above-described problems concerning the viewing angle, such as reduced display contrast, changes in display color and reversed gradation occurring when the liquid crystal display device is viewed obliquely. In particular, it is essentially difficult for the transflective liquid crystal display device to improve the viewing angle because of the use of a circular polarizer comprising one or a plurality of stretched film in principle and a polarizer.

In view of the foregoing problems, the present invention has an object to provide a liquid crystal display device which can provide bright images and is high in contrast and less in viewing angle dependency. The present invention also has an object to provide a transflective liquid crystal display device which can provide bright image and is high in contrast and less in viewing angle dependency in the transmissive mode, by arranging a reflective layer on part of the liquid crystal cell.

That is, according to a first aspect of the present invention, there is provided a liquid crystal display device comprising at least: a backlight; a polarizer; a first optically anisotropic layer with a retardation of 210 to 300 nm at a wavelength of 550 nm; a second optically anisotropic layer with a retardation of 50 to 140 nm at a wavelength of 550 nm; a third optically anisotropic layer with negative optical anisotropy; a liquid crystal cell comprising upper and lower substrates facing each other and a liquid crystal layer sandwiched between the upper and lower substrates; a fourth optically anisotropic layer with a retardation of 50 to 140 nm at a wavelength of 550 nm; a first optically anisotropic layer with a retardation of 210 to 300 nm at a wavelength of 550 nm; and a polarizer, arranged in piles in this order from the backlight, the second optically anisotropic layer comprising at least a liquid crystal film with a fixed nematic hybrid liquid crystal orientation structure.

According to a second aspect of the present invention, there is provided a liquid crystal display device comprising at least: a backlight; a polarizer; a first optically anisotropic layer with a retardation of 210 to 300 nm at a wavelength of 550 nm; a second optically anisotropic layer with a retardation of 50 to 140 nm at a wavelength of 550 nm; a liquid crystal cell comprising upper and lower substrates facing each other and a liquid crystal layer sandwiched between the upper and lower substrates; a third optically anisotropic layer with negative optical anisotropy; a fourth optically anisotropic layer with a retardation of 50 to 140 nm at a wavelength of 550 nm; a first optically anisotropic layer with a retardation of 210 to 300 nm at a wavelength of 550 nm; and a polarizer, arranged in piles in this order from the backlight, the second optically anisotropic layer comprising at least a liquid crystal film with a fixed nematic hybrid liquid crystal orientation structure.

According to a third aspect of the present invention, there is provided a liquid crystal display device comprising at least: a backlight; a polarizer; a first optically anisotropic layer with a retardation of 210 to 300 nm at a wavelength of 550 nm; a fourth optically anisotropic layer with a retardation of 50 to 140 nm at a wavelength of 550 nm; a third optically anisotropic layer with negative optical anisotropy; a liquid crystal cell comprising upper and lower substrates facing each other and a liquid crystal layer sandwiched between the upper and lower substrates; a second optically anisotropic layer with a retardation of 50 to 140 nm at a wavelength of 550 nm; a first optically anisotropic layer with a retardation of 210 to 300 nm at a wavelength of 550 nm; and a polarizer, arranged in piles in this order from the backlight, the second optically anisotropic layer comprising at least a liquid crystal film with a fixed nematic hybrid liquid crystal orientation structure.

According to a fourth aspect of the present invention, there is provided a liquid crystal display device comprising at least: a backlight; a polarizer; a first optically anisotropic layer with a retardation of 210 to 300 nm at a wavelength of 550 nm; a fourth optically anisotropic layer with a retardation of 50 to 140 nm at a wavelength of 550 nm; a liquid crystal cell comprising upper and lower substrates facing each other and a liquid crystal layer sandwiched between the upper and lower substrates; a third optically anisotropic layer with negative optical anisotropy; a second optically anisotropic layer with a retardation of 50 to 140 nm at a wavelength of 550 nm; a first optically anisotropic layer with a retardation of 210 to 300 nm at a wavelength of 550 nm; and a polarizer, arranged in piles in this order from the backlight, the second optically anisotropic layer comprising at least a liquid crystal film with a fixed nematic hybrid liquid crystal orientation structure.

According to a fifth aspect of the present invention, there is provided the liquid crystal display device according to any one of the first to fourth aspects, wherein the liquid crystal layer is of a twisted nematic mode.

According to a sixth aspect of the present invention, there is provided the liquid crystal display device according to any one of the first to fourth aspects, wherein the liquid crystal layer is of a parallel orientation with a twist angle of 0 degrees.

According to a seventh aspect of the present invention, there is provided the liquid crystal display device according to any one of the first to fourth aspects, wherein the third optically anisotropic layer fulfills the requirement set forth in formula (1) and has a plane direction retardation (Re) in the range of 0 nm to 30 nm and a thickness direction retardation (Rth) in the range of −200 nm to −30 nm, both at a wavelength of 550 nm, when (Re) and (Rth) are represented by formulas (2) and (3), respectively:

$$nx \geq ny > nz \quad (1)$$

$$Re = (nx - ny) \times d \quad (2)$$

$$Rth = \{nz(nx + ny)/2\} \times d \quad (3)$$

wherein nx and ny denote principal indices of plane direction refraction of the optically anisotropic layer, nz denotes a principal index of thickness direction refraction of the optically anisotropic layer, and d denotes the thickness (nm) thereof.

According to an eighth aspect of the present invention, there is provided the liquid crystal display device according to any one of the first to fourth aspects, wherein the third optically anisotropic layer is formed from at least one type of material selected from the group consisting of liquid crystalline compounds, triacetyl cellulose, polyamides, polyimides, polyesters, polyether ketones, polyamide imides, and cyclic olefin polymers.

According to a ninth aspect of the present invention, there is provided the liquid crystal display device according to any one of the first to fourth aspects, wherein the first and fourth optically anisotropic layers are stretched polymer films.

According to a tenth aspect of the present invention, there is provided that liquid crystal display device according to any one of the first to fourth aspects, wherein the first and fourth optically anisotropic layers are each a liquid crystal film produced by fixing a liquid crystalline substance exhibiting an optically positive uniaxiality, in a nematic orientation formed when the substance is in the liquid crystal state.

According to an eleventh aspect of the present invention, there is provided the liquid crystal display device according to any one of the first to fourth aspects, wherein the angle defined by the tilt direction of the hybrid direction of the liquid crystal film forming the second optically anisotropic layer, projected to a plane and the rubbing direction of the liquid crystal layer is in the range of 0 to 30 degrees.

According to a twelfth aspect of the present invention, there is provided the liquid crystal display device according to any one of the first to fourth aspects, wherein the second optically anisotropic layer is a liquid crystal film produced by fixing a liquid crystalline substance exhibiting an optically positive uniaxiality, in a nematic hybrid orientation formed when the substance is in the liquid crystal state, and the average tilt angle of the nematic hybrid orientation is in the range of 36 to 45 degrees.

According to a thirteenth aspect of the present invention, there is provided the liquid crystal display device according to any one of the first to seventh aspects, wherein the lower substrate of the liquid crystal cell has a transflective electrode on which a region with a reflective function and a region with a transmissive function are formed.

According to a fourteenth aspect of the present invention, there is provided the liquid crystal display device according to the thirteenth aspect, wherein the thickness of the liquid crystal layer on the region with a reflective function in the liquid crystal cell is smaller than that of the liquid crystal layer on the region with a transmissive function.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
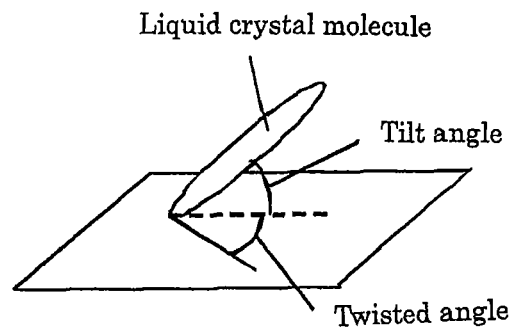
FIG. 1 is a conceptual view for describing the tilt and twisted angles of a liquid crystal molecule.

The liquid crystal display device of the present invention has a configuration selected from the following four patterns (A) to (D) and if necessary may contain components such as a light diffusing layer, a light control film, a light guide plate and a prism sheet, on which no particular restriction is imposed except for using the above-mentioned second optically anisotropic layer formed of a liquid crystal film with a fixed nematic hybrid orientation. Any of the configuration patterns (A) to (D) may be used in order to obtain optical characteristics with less viewing angle dependency:

(A) polarizer/first optically anisotropic layer/fourth optically anisotropic layer/liquid crystal cell/third optically anisotropic layer/second optically anisotropic layer/first optically anisotropic layer/polarizer/backlight;

(B) polarizer/first optically anisotropic layer/fourth optically anisotropic layer/third optically anisotropic layer/liquid crystal cell/second optically anisotropic layer/first optically anisotropic layer/polarizer/backlight (C) polarizer/first optically anisotropic layer/second optically anisotropic layer/liquid crystal cell/third optically anisotropic layer/fourth optically anisotropic layer/first optically anisotropic layer/polarizer/backlight (D) polarizer/first optically anisotropic layer/second optically anisotropic layer/third optically anisotropic layer/liquid crystal cell/fourth optically anisotropic layer/first optically anisotropic layer/polarizer/backlight.

The component parts used in the present invention will be described in order below.

First of all, the liquid crystal cell used in the present invention will be described.

Examples of the mode of the liquid crystal cell include TN (Twisted Nematic), STN (Super Twisted Nematic), ECB (Electrically Controlled Birefringence), IPS (In-Plane Switching), VA (Vertical Alignment), OCB (Optically Compensated Birefringence), HAN (Hybrid-Aligned Nematic), ASM (Axially Symmetric Aligned Microcell), Half Tone Gray Scale mode, domain divided mode, and display modes using a ferroelectric liquid crystal and an antiferroelectric liquid crystal. The mode of the liquid crystal cell used in the present invention is preferably an imaging mode using an ECB (electrically controlled birefringence) mode wherein the liquid crystal molecules are homogeneously aligned. This is because when the transmissive display part of the liquid crystal layer is thickened and the reflective display part thereof is thinned for a TN mode or an STN mode, the difference in thickness between the both parts, if enlarged, would cause liquid crystal molecules at the boundary between the both parts to align defectively and thus be likely to invite problems in production.

There is no particular restriction on the driving mode of the liquid crystal cell, which may, therefore, be a passive matrix mode used in an STN-LCD, an active matrix mode using active electrodes such as TFT (Thin Film Transistor) electrodes and TFD (Thin Film Diode) electrodes, and a plasma address mode.

The liquid crystal cell is composed of a liquid crystal layer sandwiched between two transparent substrates disposed to face each other (the viewer's side substrate may be referred to as "upper substrate" and the backlight side's substrate may be referred to as "lower substrate").

There is no particular restriction on the material forming the liquid crystal layer. Examples of the material include various low molecular weight liquid crystalline substances, polymeric liquid crystalline substances, and mixtures thereof, which can constitute various liquid crystal cells. The liquid crystalline material may be blended with dyes, chiral dopants, or non-liquid crystalline substances to an extent that they do not prevent the liquid crystal substance from exhibiting liquid crystallinity. The liquid crystal cell may be provided with various components required for the above-described various liquid crystal cell modes or various components described below.

There is no particular restriction on the transparent substrates forming the liquid crystal cell as long as they can align a liquid crystalline material forming a liquid crystal layer in a specific alignment direction. More specific examples include those which themselves have a property of aligning a liquid crystalline material and those which themselves have no capability of aligning but are provided with an alignment layer capable of aligning a liquid crystalline material. The electrode of the liquid crystal cell may be any conventional electrode, such as ITO. The electrode may be usually arranged on the surface of the transparent substrate, which surface contacts the liquid crystal layer. In the case of using a transparent substrate with an alignment layer, an electrode may be provided between the alignment layer and the substrate.

The liquid crystal display device of the present invention is a transmissive liquid crystal display using a backlight. However, a transflective liquid crystal display device which can be operated in both a reflective mode and a transmissive mode can be produced by arranging a transflective electrode provided with a region having a reflection function and a region having a transmission function, on the lower substrate of the liquid crystal cell.

There is no particular restriction on the reflection layer (hereinafter may also be referred to as "reflector"), which may, therefore, be a metal such as aluminum, silver, gold, chromium, and platinum, an alloy containing one or more of these metals, an oxide such as magnesium oxide, a multi-layered film of dielectrics, a liquid crystal film exhibiting a selective reflectivity, and combinations thereof. These reflectors may be flat or curved and may be those provided with diffusive reflectivity by forming rugged patterns on its surface; those having a function as the electrode on the transparent substrate located on the side opposite to the viewer's side; or any combination thereof.

The liquid crystal cell contains a transflective layer on which a region with a reflection function and a region with a transmission function are formed. The region with a reflection function will be a reflective display part providing images by reflection while the region with a transmission function will be a transmissive display part providing images by transmission.

The liquid crystal layer at the reflective display part in the liquid crystal cell is preferably thinner than the liquid crystal layer at the transmissive display part. The reason will be described below.

First of all, description will be given of the transmissive displaying in the transmissive display part when the thickness of the liquid crystal layer is set to be suitable for reflection displaying. When the thickness of the liquid crystal layer is adjusted to be suitable for reflective displaying, the quantity of change in polarization caused by changes in alignment of the liquid crystal layer by an external filed such as electric field is such an extent that a sufficient contrast ratio is obtained by light made incident to the liquid crystal layer from the viewer's side and reflected at the reflector to pass through the liquid crystal layer again and exit to the viewer's side so that the light goes back and forth through the liquid crystal layer. However, this setting is insufficient in quantity of change in polarization of the light passing through the liquid crystal layer in the transmissive display part. Therefore, sufficient displaying can not be obtained in the transmissive display part even if a polarizer to be used only for transmissive displaying is arranged in the rear of the liquid crystal cell, viewed from the viewer in addition to the polarizer for reflective displaying arranged on the viewer's side of the liquid crystal cell. That is, when the liquid crystal layer is aligned suitably for the reflective display part, the transmissive display part can not obtain a sufficient contrast ratio for displaying because it lacks brightness or even if the brightness is sufficient is not reduced in transmissivity for dark displaying.

More specifically, upon reflective displaying, the liquid crystal orientation state in the liquid crystal layer is controlled by an applied voltage such that a retardation of about ¼ wavelength is imparted to a light passing through the liquid crystal layer only once. Transmissive displaying effected with a liquid crystal layer with a thickness suitable for reflection displaying, i.e., by effecting a voltage modulation providing a phase modulation of a ¼ wavelength can not obtain a sufficiently bright display because the sufficient reduction of the transmittance, when the transmissive display part is in a dark display mode, causes the absorption of almost half of luminous intensity of light by the polarizer arranged on the side to which the light is reflected. Furthermore, when optical elements such as a polarizer and an optical retardation compensator are arranged so as to increase the luminosity upon a bright display mode of the transmissive display part, the luminosity of the transmissive display part in a dark display mode will be about ½ of that in the bright display mode, leading to an insufficient contrast ratio.

Contrary to this, in order to make the thickness of the liquid crystal layer suitable for transmissive displaying, a voltage modulation must be applied to the liquid crystal layer such that a retardation of a ½ wavelength will be imparted to a light transmitting the liquid crystal layer. Therefore, in order to utilize both a reflected light and a transmitted light for a display mode with high resolution and excellent visibility, the liquid crystal layer of the reflective display part must be thicker than that of the transmissive display part. Ideally, the liquid crystal layer thickness of the reflective display part is about ½ of that of the transmissive display part.

The retardation of the liquid crystal cell is preferably from 200 to 400 nm, more preferably from 250 to 350 nm in the transmissive display part and is preferably from 100 to 200 nm, more preferably from 120 to 180 nm in the reflective display part. The retardations of the transmissive and reflective display parts, deviating these ranges are not preferable because they would invite unnecessary coloration and a reduction in brightness.

There is no particular restriction on the polarizer used in the present invention as long as the objects of the present invention can be achieved. Therefore, the polarizer may be any conventional one that is generally used in liquid crystal display devices. Specific examples include PVA-based polarizing films such as polyvinyl alcohol (PVA) and partial acetalized PVA, polarizing films such as those produced by stretching a hydrophilic polymeric film comprising a partially saponified product of an ethylene-vinyl acetate copolymer and absorbing iodine and/or dichroic dye, and those comprising a polyene-oriented film such as a dechlorinated product of polyvinyl chloride. Alternatively, there may be used reflection type polarizers.

These polarizers may be used alone or in combination with a transparent protective layer provided on one or both surfaces of the polarizer for the purpose of enhancing the strength, moisture resistance, and heat resistance. Examples of the protective layer include those formed by laminating a transparent plastic film such as polyester, triacetyl cellulose or a cyclic olefin polymer directly or via an adhesive layer on the polarizer; coated layers of transparent resin; and acrylic- or epoxy-based photo-setting type resin layers. When the protective layers are coated on the both surfaces of the polarizing film, they may be the same or different from one another.

There is no particular restriction on the first and fourth optically anisotropic layers used in the present invention as long as they are excellent in transparency and uniformity. However, each of the layers is preferably a polymeric stretched film or an optical compensation film formed from a liquid crystalline material. Examples of the polymeric stretched film include uniaxial or biaxial retardation films formed from cellulose-, polycarbonate-, poltarylate-, polysulfone-, polyacryl, polyethersulfone-, or cyclic olefin-based polymers. The first and fourth optically anisotropic layers exemplified herein may be composed of a polymeric stretched film or an optical film formed from a liquid crystalline material alone or the combination thereof. Among these polymeric stretched films, preferred are cyclic olefin-based polymers because they are cost effective and can suppress the change of color modulation of image quality due to their film uniformity and small birefringence wavelength dispersion. Examples of the optical film formed from a liquid crystalline material include those comprised of various liquid crystalline polymeric compounds of main chain- and/or side chain-types, such as liquid crystalline polyesters, liquid crystalline polycarbonates, liquid crystalline polyacrylates, or low molecular weight liquid crystalline compounds having reactivities which can be polymerized by cross-linking or the like after being aligned. These films may be a single-layered film with self-supportivity or formed over a transparent supporting substrate.

The retardation value of the first optically anisotropic layer at a wavelength of 550 nm is so adjusted to be from 210 to 300 nm. The retardation value is preferably from 250 to 275 nm.

The retardation value of the fourth optically anisotropic layer at a wavelength of 550 nm is so adjusted to be from 50 to 140 nm. The retardation value is preferably from 70 to 120 nm.

The second optically anisotropic layer used in the present invention is a layer comprising at least a liquid crystal film produced by fixing a liquid crystalline polymer exhibiting an optically positive uniaxiality, more specifically a polymeric liquid crystalline compound exhibiting an optically positive uniaxiality or a polymeric liquid crystal composition containing at least one type selected from the polymeric liquid crystalline compounds and exhibiting an optically positive uniaxiality, in a nematic hybrid orientation with an average tilt angle of 5 to 45 degrees, formed when the liquid crystalline polymeric compound or composition is in a liquid crystal state.

The term "nematic hybrid orientation" used herein refers to an orientation structure wherein the liquid crystal molecules are aligned in a nematic orientation wherein the angles of the directors of the liquid crystalline molecules relative to the film upper surface and the lower film surface are different from each other. Therefore, since the angles formed by the directors and the film planes are different between in the vicinities of the upper and lower interfaces of the film, the nematic hybrid orientation can be referred to as an orientation wherein the angles vary continuously between the upper and lower film surfaces.

In a liquid crystal film with a fixed nematic hybrid orientation structure, the directors of the liquid crystalline molecules are directed at different angles in all the positions in the film thickness direction. Therefore, it can be said that there no longer exists optical axis in the whole film structure.

The term "average tilt angle" used herein refers to an average value of the angles defined between the directors of the liquid crystalline molecules and a film plane, in the thickness direction of the liquid crystal film. In the liquid crystal film used in the present invention, the absolute value of the angle formed by a director in the vicinity of one of the film surfaces and the film surface is generally from 20 to 90 degrees, preferably from 40 to 85 degrees, more preferably from 70 to 80 degrees while the absolute value of the angle formed by the director and the other film surface is generally from 0 to 20 degrees, preferably from 0 to 10 degrees. The absolute value of the average tilt angle is generally from 5 to 45 degrees, preferably from 20 to 45 degrees, more preferably from 25 to 43 degrees, most preferably from 36 to 40 degrees. The average tilt angle, if deviating from the above ranges, would cause the contrast of the resulting liquid crystal display device to decrease when the device is viewed from an oblique direction. The average tilt angle can be determined by applying a crystal rotation method.

The liquid crystal film forming the second optically anisotropic layer used in the present invention may be formed from any liquid crystalline material as long as the material can be fixed in a nematic hybrid orientation with the specific average tilt angle, as described above. For example, the film may be a liquid crystal film produced by allowing a low molecular weight liquid crystalline substance to be in a liquid crystal state, and then aligning the substance in a nematic hybrid orientation and fixing the aligned orientation by photo- or thermal-cross-linking or a liquid crystal film produced by allowing a polymeric liquid crystalline substance to be in a liquid crystal state and then aligning the substance in a nematic hybrid orientation and fixing the aligned orientation by cooling. The term "liquid crystal film" used herein refers to those produced by forming a liquid crystalline substance such as a low molecular weight or polymeric liquid crystalline substance into a film, regardless of whether or not the liquid crystal film itself exhibits liquid crystallinity.

The thickness of the liquid crystal film to exhibit more suitable viewing angle improving effect for the liquid crystal display device varies depending on the display mode thereof or various optical parameters but is usually from 0.2 to 10 μm, preferably from 0.3 to 5 μm, particularly preferably from 0.5 to 2 μm. A film thickness of less than 0.2 μm would fail to attain a sufficient compensation effect. A film thickness of greater than 10 μm would cause unnecessary colored image in the liquid crystal display device.

With regard to an apparent retardation value in the plane of a liquid crystal film when viewed from the normal direction thereof, the refractive index (ne) in the direction parallel to directors is different from the refractive index (no) in the direction perpendicular to directors, in a liquid crystal film with a fixed nematic hybrid orientation structure and, therefore, assuming that the value obtained by subtracting no from ne (ne−no) is an apparent birefringence, an apparent retardation value is given as the product of the apparent birefringence and the absolute film thickness. This apparent retardation value is easily obtained by a polarization optical measurement such as ellipsometry. The retardation value of the liquid crystal film used as a compensation element is usually from 10 to 400 nm, preferably from 30 to 200 nm, particularly preferably from 50 to 140 nm with respect to a monochromic light of 550 nm. A retardation value of smaller than 10 nm would result in failure to attain a sufficient viewing angle enlarging effect. A retardation value of larger than 400 nm would cause unnecessary coloration on the liquid crystal display device when viewed obliquely.

The specific conditions for the arrangement of the optical anisotropic layers in the liquid crystal display device of the present invention will be described in more details. In order to describe the specific arrangement conditions, the upper and lower planes and tilt direction of the optically anisotropic layer formed of a liquid crystal film and the pre-tilt direction of the liquid crystal cell are defined as follows using FIGS. 1 to 3.

When the upper and lower planes of the optically anisotropic layer formed of the liquid crystal film are defined by the angles formed by the directors of the liquid crystalline molecules in the vicinity of the film interfaces and the film planes, the plane forming an angle of 20 to 90 degrees at the acute angle side with the director is defined as "b-plane", while the plane forming an angle of 0 to 20 degrees at the acute angle side with the director is defined as "c-plane".

Figure 2:
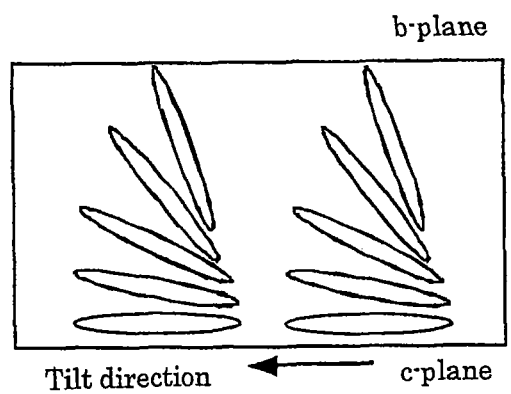
FIG. 2 is a conceptual view for describing the aligned structure of the liquid crystal film forming the second optically anisotropic layer.
Figure 3:
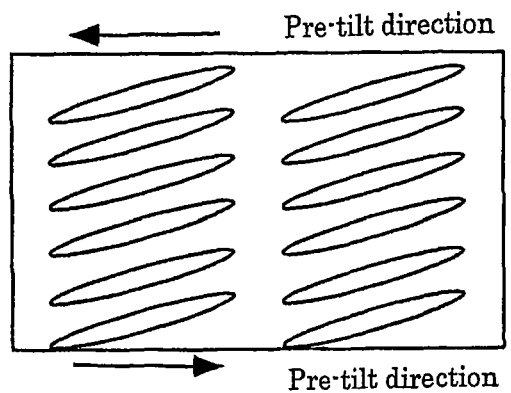
FIG. 3 is a conceptual view for describing the pre-tilt direction of the liquid crystal cell.

When c-plane is viewed from b-plane through the optically anisotropic layer, the direction in which the angles between the directors of the liquid crystal molecules and the projection thereof to the c-plane are acute and which is parallel to the projection is defined as "tilt direction" (see FIGS. 1 and 2).

Next, on the cell interface of the liquid crystal cell, the low molecular weight liquid crystal for driving the liquid crystal cell is not generally parallel to the cell interface and tilted at a certain angle, which angle is generally referred to as "pre-tilt angle". However, a direction along which the director of a liquid crystalline molecule on the cell interface and the projection thereof form an acute angle and which is parallel to the projection is herein defined as "pre-tilt direction of the liquid crystal cell" (see FIG. 3).

The third optically anisotropic layer used in the present invention is negative in refractive index anisotropy, i.e., satisfies the requirement defined by formula (1) below, and preferably the nx and ny of the third optically anisotropic layer are substantially equal to one another. The third optically anisotropic layer is preferably from 0 to 30 nm, more preferably from 0 to 10 nm in Re (retardation in the plane direction at a wavelength of 550 nm) defined by formula (2) below. The third optically anisotropic layer is also preferably from −200 to −30 nm, more preferably from −150 to −50 nm in Rth (retardation in the thickness direction at a wavelength of 550 nm) defined by formula (3) below.

$$nx \geq ny > nz \quad (1)$$

$$Re = (nx - ny) \times d \quad (2)$$

$$Rth = \{nz - (nx + ny)/2\} \times d \quad (3)$$

wherein nx and ny denote principal indices of plane direction refraction of the optically anisotropic layer, nz denotes a principal index of thickness direction refraction of the optically anisotropic layer, and d denotes the thickness (nm) thereof.

In the present invention, the third optically anisotropic layer may be formed of a single layer or multi layers as long as it exhibits a negative optical anisotropy and satisfies the requirement defined by formula (1). The third optically anisotropic layer may be a polymer film wherein optical anisotropy is exhibited or any of those wherein optical anisotropy is exhibited by aligning liquid crystalline molecules. When the third optically anisotropic element is a polymer film, examples thereof include triacetyl cellulose, polyamides, polyimides, polyesters, polyetherketones, polyamideimides, polyesterimides, and modified polycarbonates. There is no particular restriction on these materials and any material other than these material can be used if it can assume an aligned state of polymer molecule chain as in the case with the aligned state of the molecular chain of the foregoing materials. Among these materials, preferred are polymer films formed from triacetyl cellulose or polyimides. Polymer films may be biaxially stretched so as to exhibit the desired Rth. Alternatively, Rth may be adjusted by adding additives to a polymer. Japanese Patent Laid-Open Publication Nos. 2000-111914 and 2001-166144 disclose techniques for adjusting the Rth of triacetyl cellulose.

When the third optically anisotropic layer is formed from liquid crystalline molecules, it is formed from preferably discotic liquid crystalline molecules or cholesteric liquid crystalline molecules, more preferably discotic liquid crystalline molecules. Aligning of discotic liquid crystalline molecules substantially horizontally with respect to a substrate renders it possible to form a layer exhibiting a negative optical anisotropy. Such an alignment technique is disclosed in Japanese Patent Laid-Open Publication No. 11-352328 and also can be utilized in the present invention. The term "substantially horizontally" means that the average angle formed by the optical axis of a discotic liquid crystalline molecule and the normal direction of a substrate is within the range of 0±10 degrees. Discotic liquid crystalline molecules may be obliquely aligned at an average tilt angle of not 0 degree (specifically within the range of 0110 degrees) or may be aligned in a hybrid orientation wherein tilt angle gradually changes. Alternatively, the foregoing aligned state may be deformed to be twisted by adding a chiral dopant or applying shear stress.

Cholesteric liquid crystalline molecules exhibit a negative optical anisotropy with their helical twisted orientation. Aligning helically cholesteric liquid crystalline molecules and controlling the twist angle or retardation value render it possible to obtain desired optical characteristics. Cholesteric liquid crystalline molecules can be aligned in a twisted orientation with a conventional manner.

Liquid crystalline molecules are preferably fixed in an aligned state and more preferably fixed therein by polymerization.

Description will be given of preferable discotic liquid crystalline molecules forming the third optically anisotropic layer. Discotic liquid crystalline molecules are preferably aligned substantially horizontally (average tilt angle within the range of 0 to 40 degrees) to a polymer film plane. Discotic liquid crystalline molecules may be obliquely aligned or may be aligned so that the tilt angle will gradually change (hybrid orientation). For either of the tilt orientation or the hybrid orientation, the average tilt angle is preferably from 0 to 40 degrees. Discotic liquid crystalline molecules are described in various literatures (Mol. Cryst. Liq. Cryst., vol. 71, page 111 (1981), C. Destrade et al.; Quarterly Chemistry Survey, No. 22, The Chemistry of Liquid Crystals, Chapter 5, Chapter 10, Section 2 (1994), edited by Japan Chem. Soc.; Angew. Chem. Soc. Chem. Comm., page 1794 (1985), B. Kohne et al.; J. Am. Chem. Soc., vol. 116, page 2,655 (1994), J. Zhang et al. Polymerization of discotic liquid-crystal molecules is described in Japanese Patent Laid-Open Publication No. 8-27284. In order to fix discotic liquid crystalline molecules by polymerization, a polymerizable group should be bound to a discotic core of the discotic liquid crystalline molecules. However, if the polymerizable group is directly bound to the discotic core, it is difficult to keep the alignment at the polymerization reaction. Therefore, a linking group is introduced between the discotic core and the polymerizable group. Discotic liquid crystalline molecule having a polymerizable group is described in Japanese Patent Laid-Open Publication No. 2001-4387.

The above-described first, second, third and fourth optically anisotropic layers may be attached to each other via an adhesive or tacky adhesive layer.

There is no particular restriction on adhesives for forming the adhesive layer as long as they have enough adhesivity to the optically anisotropic layers and do not harm the optical characteristics of thereof. Examples of the adhesives include acrylic resin-, methacrylic resin-, epoxy resin-, ethylene-vinyl acetate copolymer-, rubber-, urethane-, polyvinylether-based adhesives, and mixtures thereof and various reactive adhesives such as of thermal curing and/or photo curing types, and electron radiation curing types. The adhesive may be an adhesive having a function of a transparent protective layer for protecting the optically anisotropic layers.

There is no particular restriction on tacky adhesives for forming the tacky adhesive layer. There may be used any tacky adhesive appropriately selected from those containing a polymer such as an acrylic polymer, a silicone-based polymer, a polyester, a polyurethane, a polyamide, a polyether, a fluorine- or rubber-based polymer as a base polymer. In particular, it is preferred to use a tacky adhesive such as an acrylic tacky adhesive which is excellent in optical transparency, weather resistance and heat resistance and exhibits tackiness characteristics such as moderate wettability, cohesivity and adhesivity.

The adhesive layer or tacky adhesive layer may be formed by any suitable method. Examples of the method include a method wherein a base polymer or a composition thereof is dissolved or dispersed in a solvent containing toluene or ethyl acetate alone or in combination thereby preparing a tacky adhesive or adhesive solution containing 10 to 40 percent by mass of the tacky adhesive or adhesive, which solution is then directly laid over the above-described optically anisotropic layer by an appropriate developing method such as casting or coating or a method wherein a tacky adhesive or adhesive layer is formed in accordance with the method as described above on a separator and then transferred onto the optically anisotropic layers. The tacky adhesive or adhesive layer may contain additives such as natural or synthetic resins, in particular fillers or pigments containing tackiness-imparting resins, glass fibers, glass beads, metal powders, and other inorganic powders, dyes, and anti-oxidants. The tacky adhesive or adhesive layer may contain fine particles so as to exhibit light diffusivity.

When the optically anisotropic layers are attached to each other via a tacky adhesive or adhesive layer, they may be subjected to a surface treatment so as to improve their adhesivity to the tacky adhesive or adhesive layer. There is no particular restriction on the method of the surface treatment. There may be suitably used a surface treatment such as corona discharge, sputtering, low-pressure UV irradiation, or plasma treatment, which can maintain the transparency of the liquid crystal film surface. Among these surface treatments, corona discharge treatment is excellent.

Next, description will be given of the configurations of the liquid crystal display devices comprising the above-described members, according to the present invention.

The configurations of the liquid crystal display devices of the present invention are necessarily selected from the following four patterns as shown in FIGS. 4, 7, 10 and 13:

(A) polarizer/first optically anisotropic layer/fourth optically anisotropic layer/liquid crystal cell/third optically anisotropic layer/second optically anisotropic layer/first optically anisotropic layer/polarizer/backlight;

(B) polarizer/first optically anisotropic layer/fourth optically anisotropic layer/third optically anisotropic layer/liquid crystal cell/second optically anisotropic layer/first optically anisotropic layer/polarizer/backlight (C) polarizer/first optically anisotropic layer/second optically anisotropic layer/liquid crystal cell/third optically anisotropic layer/fourth optically anisotropic layer/first optically anisotropic layer/polarizer/backlight (D) polarizer/first optically anisotropic layer/second optically anisotropic layer/third optically anisotropic layer/liquid crystal cell/fourth optically anisotropic layer/first optically anisotropic layer/polarizer/backlight.

The angle formed by the pre-tilt direction of the liquid crystal layer in the liquid crystal cell and the tilt direction of the second optically anisotropic layer formed of a liquid crystal film wherein a nematic hybrid orientation is fixed is preferably from 0 to 30 degrees, more preferably 0 to 20 degrees, particularly preferably from 0 to 10 degrees. The angle of larger than 30 degrees would fail to attain a sufficient viewing angle compensation effect.

The angle formed by the slow axis of the first optically anisotropic layer and the tilt direction of the second optically anisotropic layer is preferably 50 degrees or larger and smaller than 80 degrees, more preferably 55 degrees or larger and smaller than 75 degrees. The angle of 80 degrees or larger or smaller than 55 degrees would cause a reduction in front contrast.

The angle formed by the slow axis of the first optically anisotropic layer and the slow axis of the fourth optically anisotropic layer is preferably 50 degrees or larger and smaller than 80 degrees, more preferably 55 degrees or larger and smaller than 75 degrees. The angle of larger than 80 degrees or smaller than 55 degrees would cause a reduction in front contrast.

There is no particular restriction on the aforesaid light diffusion layer, backlight, light controlling film, light guide plate and prism sheet, which may be those that have been conventionally used.

In addition to the above-described components, the liquid crystal display device of the present invention may be provided with other additional components. For example, the use of a color filter makes it possible to produce a color liquid crystal display device which can provide multi- or full-colored display images with increased color purity.

Effects of the Invention

The liquid crystal display device of the present invention has features that it is bright in displaying, high in front contrast and less in viewing angle dependency. The provision of a reflection layer in part of the liquid crystal cell renders it possible to produce a transflective liquid crystal display device which can display bright images and is high in contras and less in viewing angle dependency in the transmission mode.

EXAMPLES

The present invention will be further described in the following examples, but the present invention should not be construed as being limited thereto. The retardations ($\Delta$nd) in the examples are values at a wavelength of 550 nm, unless stated otherwise.

(Preparation of Third Optically Anisotropic Layer 13)

A polyimide with a weight-average molecular weight (Mw) of 70000 and a $\Delta$n of about 0.04 was synthesized from 2,2'-bis(3,4-dicarboxyphenyl)hexafluoropropane dianhydride (6FDA) and 2,2'-bis(trifluoromethyl)-4,4'-diaminobiphenyl (TFMB). On a 80 μm thick triacetyl cellulose was coated a solution of 25 percent by mass of the polyimide prepared using cyclohexanone as a solvent. The coated triacetyl cellulose was heated at a temperature of 150° C. for 5 minutes thereby producing a totally transparent smooth film 13. The film had a retardation in the plane Re=1 nm, a retardation in the thickness direction Rth=−100 nm, and nx÷ny>nz.

Example 1

Figure 4:
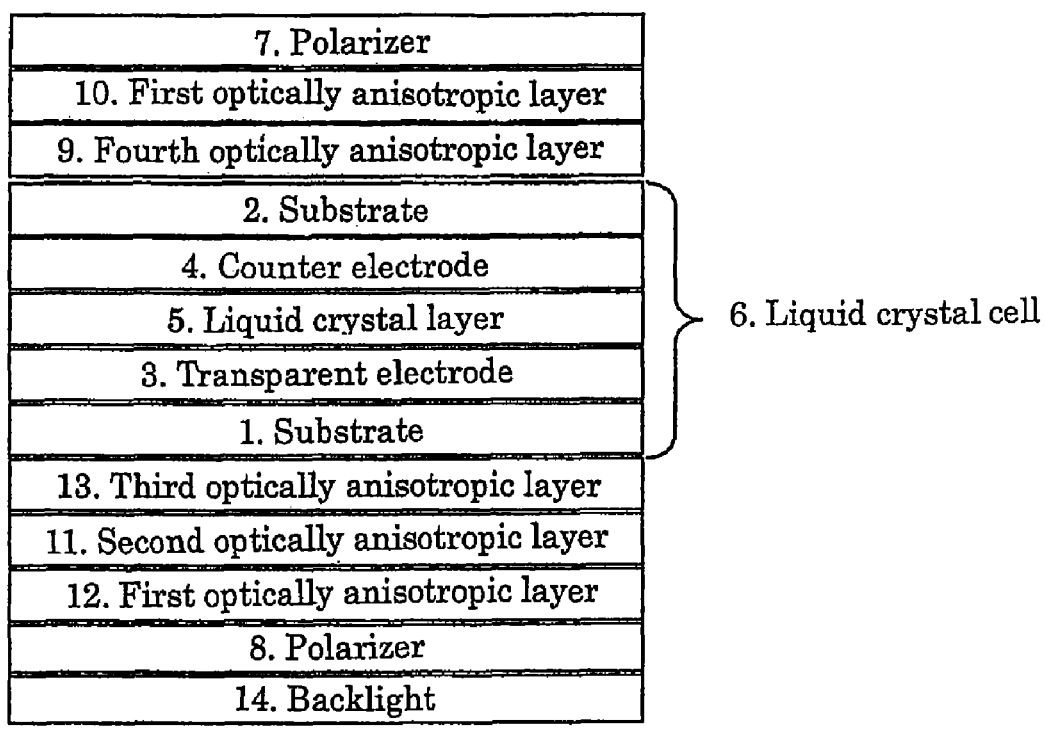
FIG. 4 is a schematic cross-sectional view of the liquid crystal display device of Example 1.

The configuration and axis arrangement of the liquid crystal display device of Example 1 will be described with reference to FIGS. 4 and 5, respectively.

On a substrate 1 is arranged a transparent electrode 3 formed from a highly transmissive material such as ITO while on a substrate 2 is a counter electrode 4 formed from a highly transmissive material such as ITO. A liquid crystal layer 5 formed from a liquid crystalline material exhibiting positive dielectric constant anisotropy is sandwiched between the transparent electrode 3 and the counter electrode 4. A fourth optically anisotropic layer 9, a first optically anisotropic layer 10 and a polarizer 7 are arranged on the side of the substrate 2, opposite to the side on which the counter electrode 4 is formed while a third optically anisotropic layer 13, a second optically anisotropic layer 11, a first optically anisotropic layer 12 and a polarizer 8 are arranged on the side of the substrate 1, opposite to the side on which the transparent electrode 3 is formed. A backlight 14 is arranged in the rear side of the polarizer 8, as viewed from the viewer.

In accordance with the disclosures of Japanese Patent Laid-Open Publication No. 6-347742, the second optically anisotropic layer 11 was prepared which layer was formed of a 0.86 μm thick liquid crystal film with a fixed nematic hybrid orientation wherein the average tilt angle in the film thickness direction was 40 degrees. A liquid crystal display device was produced so as to have the axis arrangement as shown in FIG. 5.

The liquid crystal cell 6 used in this example was produced using ZLI-1695 manufactured by Merck Ltd as a liquid crystalline material so that the liquid crystal layer thickness was 4.9 μm. The pre-tilt angle at both of the cell interfaces was 2 degrees, while the Δnd of the liquid crystal cell was approximately 320 nm.

The polarizer 7 (thickness: about 100 μm; SQW-062 manufactured by Sumitomo Chemical Industry Co., Ltd.) was disposed on the viewer's side (the upper portion in FIG. 4) of the liquid crystal cell 6. Between the polarizer 7 and the liquid crystal cell 6 were disposed a polymeric stretched film formed of a uniaxially stretched norbornene copolymer film as the first optically anisotropic layer 10 and a polymeric stretched film formed of a uniaxially stretched norbornene copolymer film as the fourth optically anisotropic layer 9. The Δnd of the polymeric stretched film 10 was approximately 270 nm while the Δnd of the polymeric stretched film 9 was approximately 110 nm.

In the rear of the liquid crystal cell 6 viewed from the viewer were arranged a negative film with Rth=−100 nm produced above as the third optically anisotropic layer 13, a liquid crystal film as the second optically anisotropic layer 11 and a polymeric stretched film formed of a uniaxially stretched norbornene copolymer film as the first optically anisotropic layer 12, on the back of which a polarizer 8 was arranged. The Δnd of the liquid crystal film 11 with a fixed nematic hybrid orientation was 105 nm while the Δnd of the uniaxially stretched polymeric film 12 was 265 nm.

Figure 5:
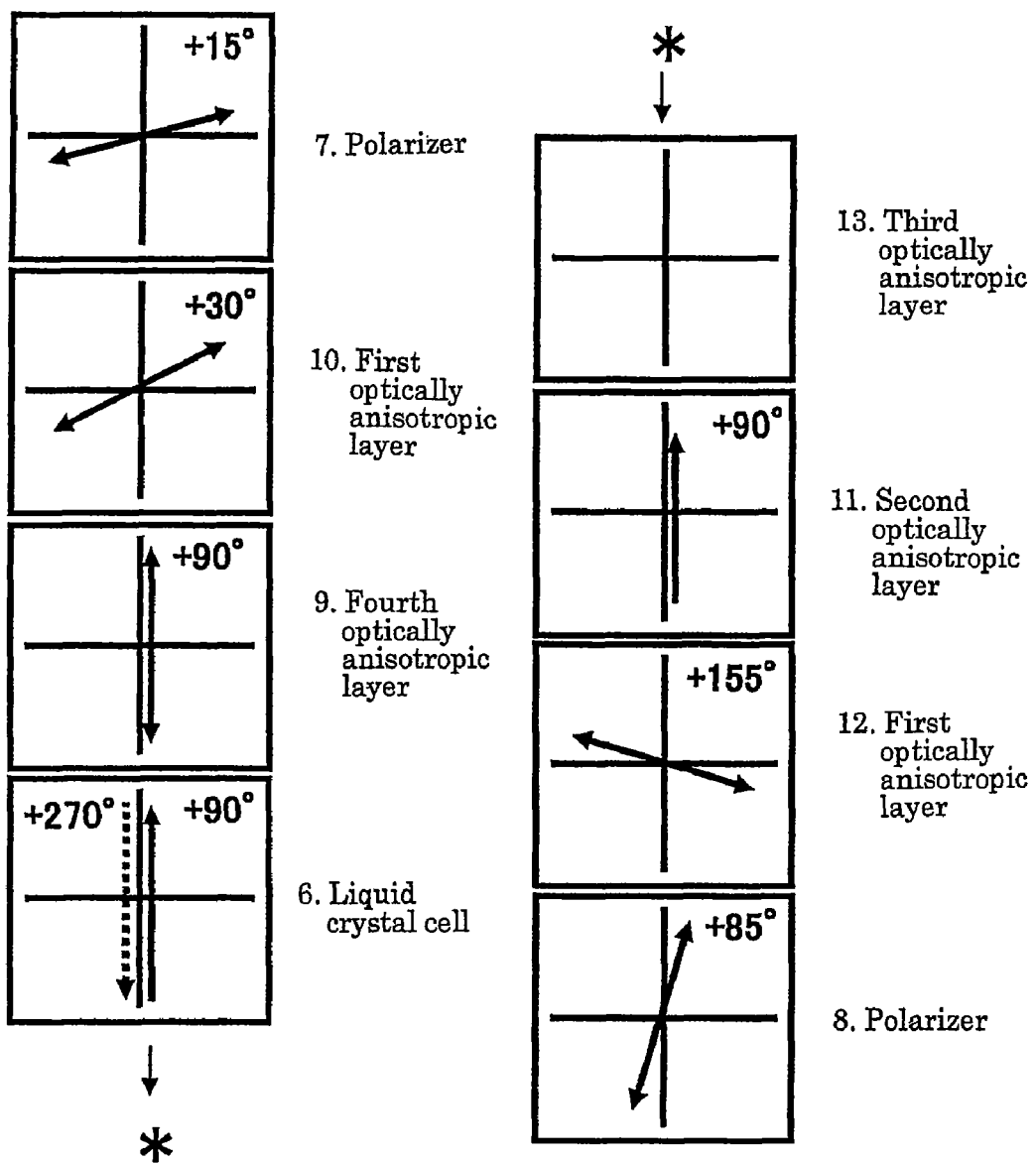
FIG. 5 is a plan view indicating the angular relation of the absorption axes of the polarizers, the pre-tilt direction of the liquid crystal cell, the slow axes of the polymeric stretched films and the tilt direction of the liquid crystal film in Example 1.

The absorption axes of the polarizers 7, 8, the slow axes of the polymeric stretched films 9, and 12, the pre-tilt direction of the liquid crystal cell 6 at both of the interfaces and the tilt direction of the liquid crystal film 11 were oriented as shown in FIG. 5.

Figure 6:
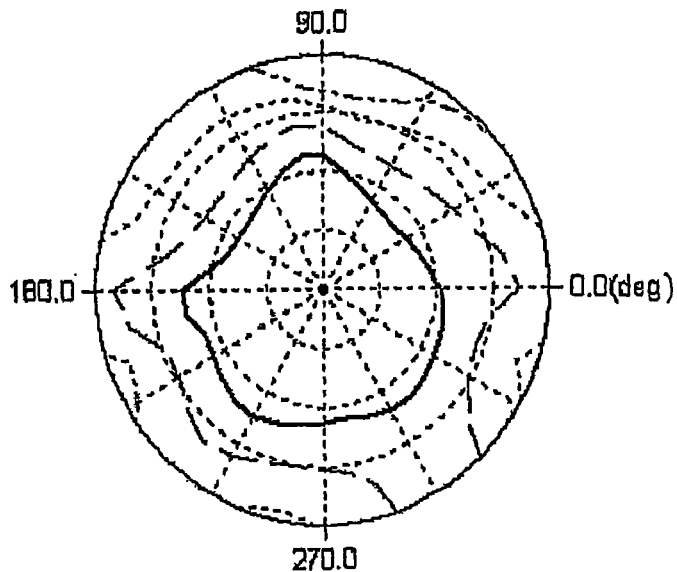
FIG. 6 is a view indicating the contrast ratio when viewing the liquid crystal display device of Example 1 from all the directions.

FIG. 6 shows the contrast ratio from all the directions defined by the transmissivity ratio of white image 0 V and black image 5 V "(white image)/(black image)" when the backlight is on. The concentric circles are drawn to be at an interval of 20 degrees. Therefore, the outermost circle indicates 80 degrees from the center.

It was confirmed from FIG. 6 that the liquid crystal display device had excellent viewing angle characteristics.

Example 2

Figure 7:
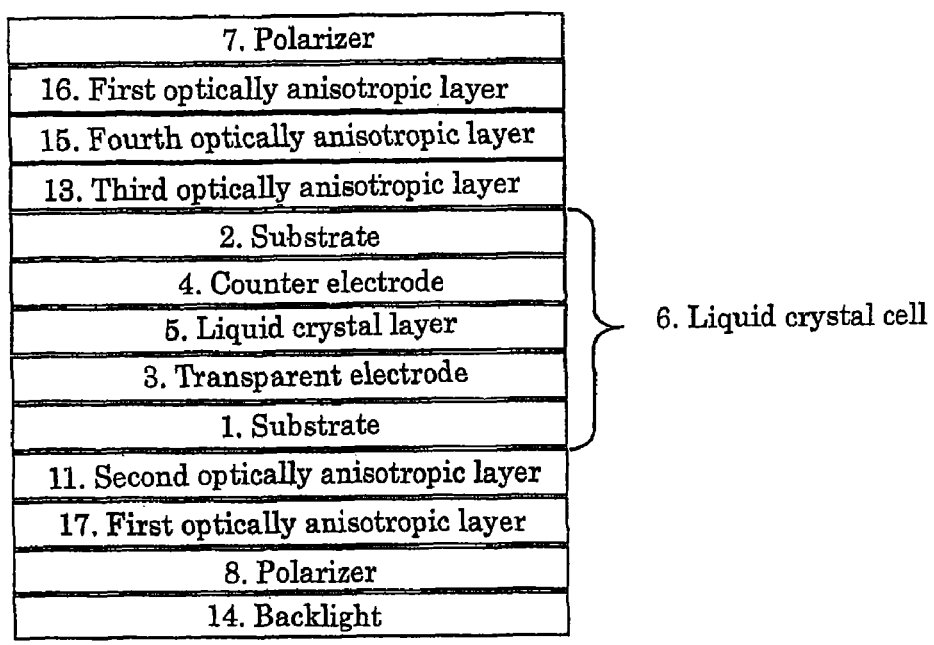
FIG. 7 is a schematic cross-sectional view of the liquid crystal display device of Example 2.

The configuration and axis arrangement of the liquid crystal display device of Example 2 will be described with reference to FIGS. 7 and 8, respectively.

The liquid crystal cell 6 of Example 1 is used. On the side of the substrate 2 opposite to the side on which the counter electrode 4 is formed are arranged a third optically anisotropic layer 13, a fourth optically anisotropic layer 15, a first optically anisotropic layer 16 and a polarizer 7. On the side of the substrate 1 opposite to the side on which the transparent electrode 3 is formed are arranged a second optically anisotropic layer 11, a first optically anisotropic layer 17 and a polarizer 8. A backlight 14 was arranged in the rear of the polarizer 8.

The polarizers 7,8, the second optically anisotropic layer 11, and the third optically anisotropic layer 13 are the same as those used in Example 1.

The polarizer 7 was disposed on the viewer's side (the upper portion in FIG. 7) of the liquid crystal cell 6. Between the polarizer 7 and the liquid crystal cell 6 were disposed a polymeric stretched film formed of a uniaxially stretched norbornene copolymer film as the first optically anisotropic layer 16, a polymeric stretched film formed of a uniaxially stretched norbornene copolymer film as the fourth optically anisotropic layer 15 and a negative film 13 with Rth=−100 nm produced above as the third optically anisotropic layer 13. The Δnd of the polymeric stretched film 16 was approximately 270 nm while the Δnd of the polymeric stretched film 15 was approximately 110 nm.

In the rear of the liquid crystal cell 6 viewed from the viewer were arranged a liquid crystal film as the second optically anisotropic layer 11 and a polymeric stretched film formed of a uniaxially stretched norbornene copolymer film as the first optically anisotropic layer 17, on the back of which a polarizer 8 was arranged. The Δnd of the liquid crystal film 11 with a fixed nematic hybrid orientation was 105 nm while the Δnd of the uniaxially stretched polymeric film 17 was 265 nm.

Figure 8:
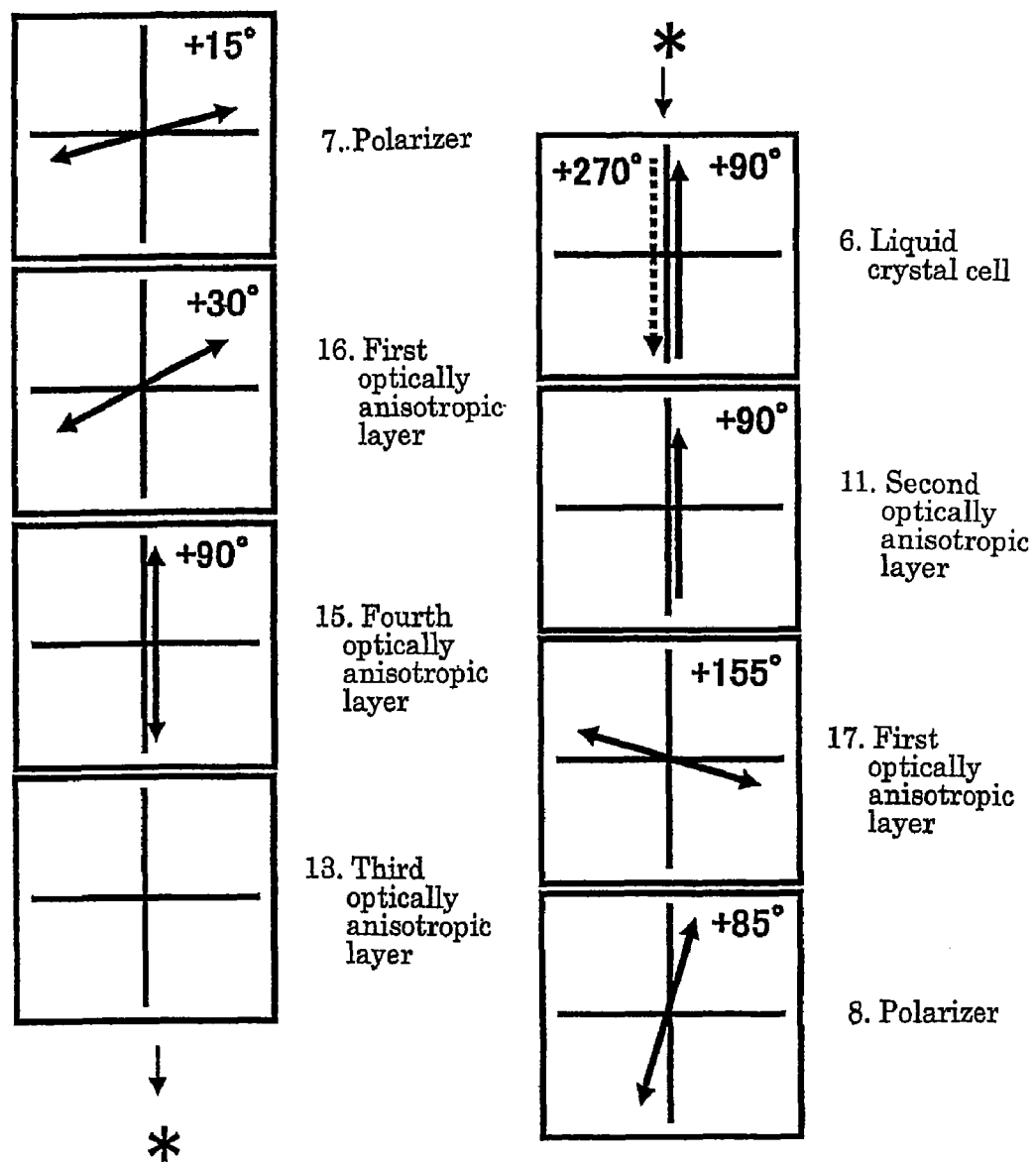
FIG. 8 is a plan view indicating the angular relation of the absorption axes of the polarizers, the pre-tilt direction of the liquid crystal cell, the slow axes of the polymeric stretched films and the tilt direction of the liquid crystal film in Example 2.

The absorption axes of the polarizers 7, 8, the slow axes of the polymeric stretched films 15, 16 and 17, the pre-tilt direction of the liquid crystal cell 6 at both of the interfaces and the tilt direction of the liquid crystal film 11 were oriented as shown in FIG. 8.

Figure 9:
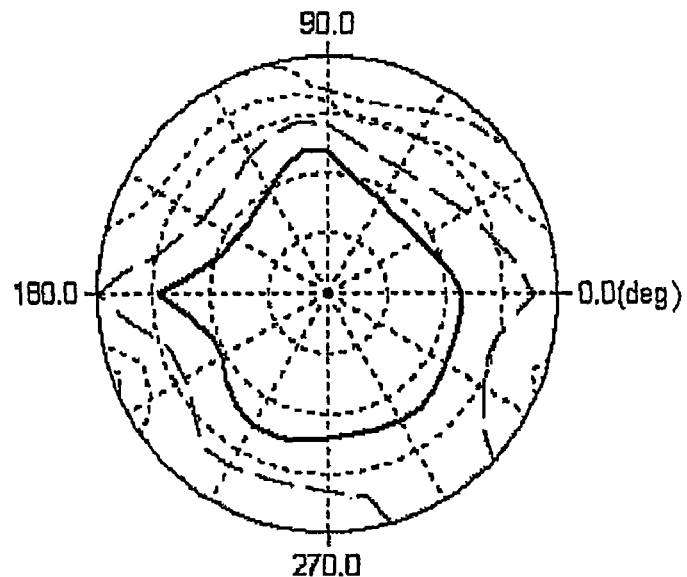
FIG. 9 is a view indicating the contrast ratio when viewing the liquid crystal display device of Example 2 from all the directions.

FIG. 9 shows the contrast ratio from all the directions defined by the transmissivity ratio of white image 0 V and black image 5 V "(white image)/(black image)" when the backlight is on. The concentric circles are drawn to be at an interval of 20 degrees. Therefore, the outermost circle indicates 80 degrees from the center.

It was confirmed from FIG. 9 that the liquid crystal display device had excellent viewing angle characteristics.

Example 3

Figure 10:
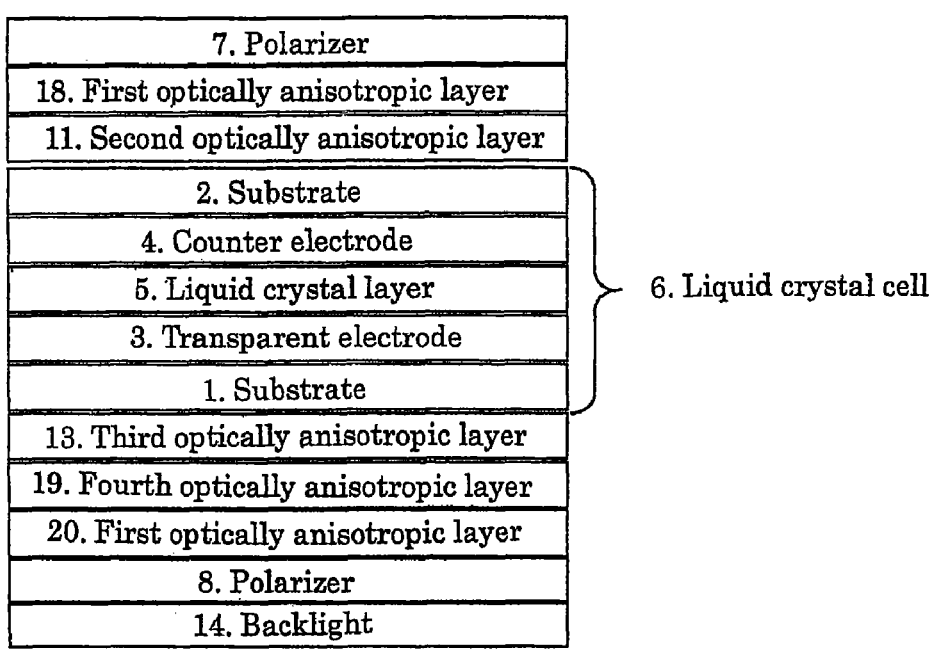
FIG. 10 is a schematic cross-sectional view of the liquid crystal display device of Example 3.

The configuration and axis arrangement of the liquid crystal display device of Example 3 will be described with reference to FIGS. 10 and 11, respectively.

The liquid crystal cell 6 of Example 1 is used. On the side of the substrate 2 opposite to the side on which the counter electrode 4 is formed are arranged a second optically anisotropic layer 11, a first optically anisotropic layer 18 and a polarizer 7. On the side of the substrate 1 opposite to the side on which the transparent electrode 3 is formed are arranged a third optically anisotropic layer 13, a fourth optically anisotropic layer 19, a first optically anisotropic layer 20 and a polarizer 8. A backlight 14 is arranged in the rear of the polarizer 8.

The polarizers 7,8, the second optically anisotropic layer 11, and the third optically anisotropic layer 13 were the same as those used in Example 1.

The polarizer 7 was disposed on the viewer's side (the upper portion in FIG. 10) of the liquid crystal cell 6. Between the polarizer 7 and the liquid crystal cell 6 are disposed a polymeric stretched film formed of a uniaxially stretched norbornene copolymer film as the first optically anisotropic layer 18 and a liquid crystal film as the second optically anisotropic layer 11. The Δnd of the polymeric stretched film 18 was approximately 265 nm while the Δnd of the liquid crystal film 11 with a fixed hybrid nematic orientation was approximately 105 nm.

In the rear of the liquid crystal cell 6 viewed from the viewer were arranged a negative film with Rth=−100 nm produced above as the third optically anisotropic layer 13, a polymeric stretched film formed of a uniaxially stretched norbornene copolymer film as the fourth optically anisotropic layer 19 and a polymeric stretched film formed of a uniaxially stretched norbornene copolymer film as the first optically anisotropic layer 20, on the back of which the polarizer 8 was arranged. The Δnd of the uniaxially stretched polymeric film 19 was 110 nm while the Δnd of the uniaxially stretched polymeric film 20 was 270 nm.

Figure 11:
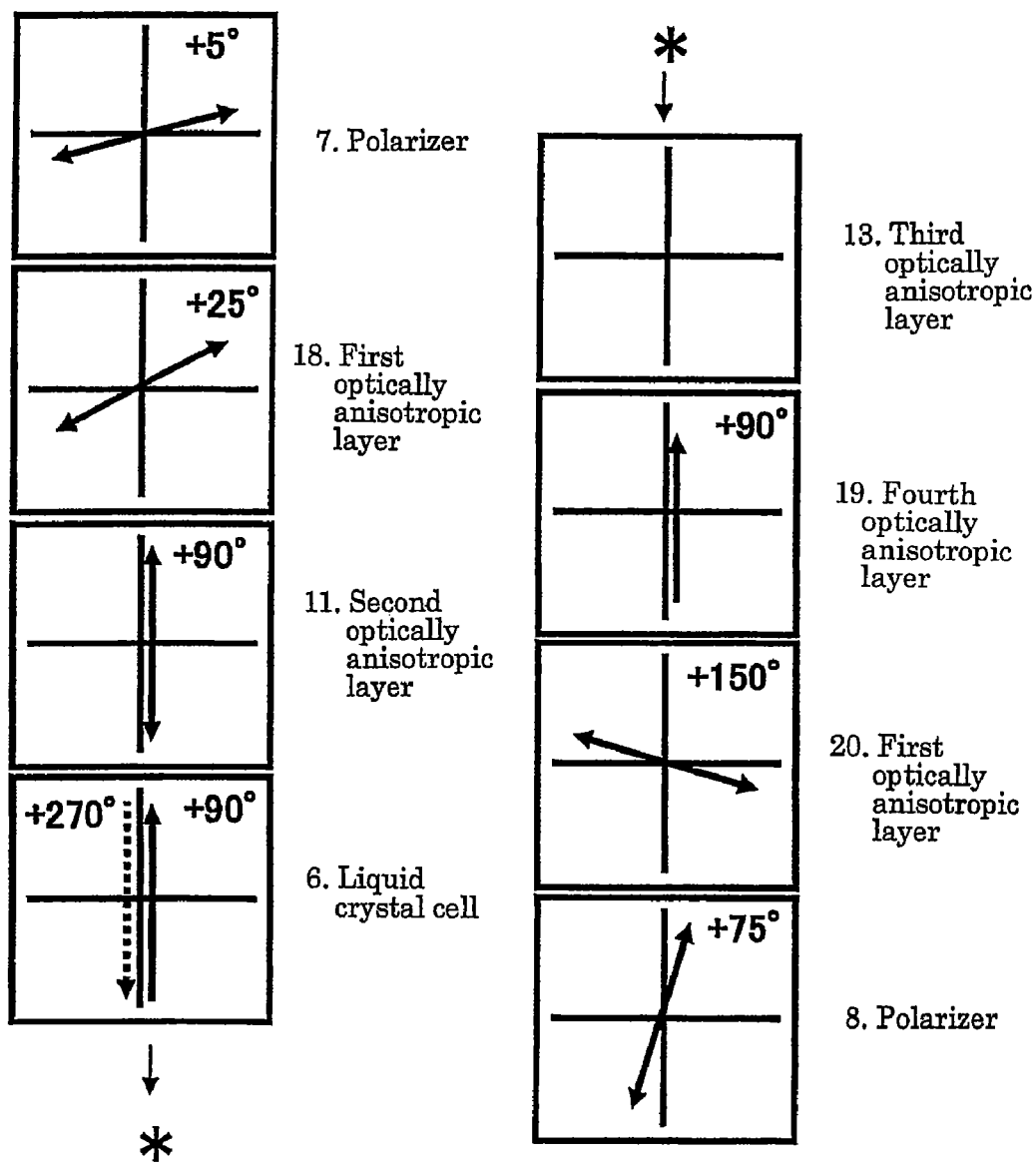
FIG. 11 is a plan view indicating the angular relation of the absorption axes of the polarizers, the pre-tilt direction of the liquid crystal cell, the slow axes of the polymeric stretched films and the tilt direction of the liquid crystal film in Example 3.

The absorption axes of the polarizers 7, 8, the slow axes of the polymeric stretched films 18, 19 and 20, the pre-tilt direction of the liquid crystal cell 6 at both of the interfaces and the tilt direction of the liquid crystal film 11 were oriented as shown in FIG. 11.

Figure 12:
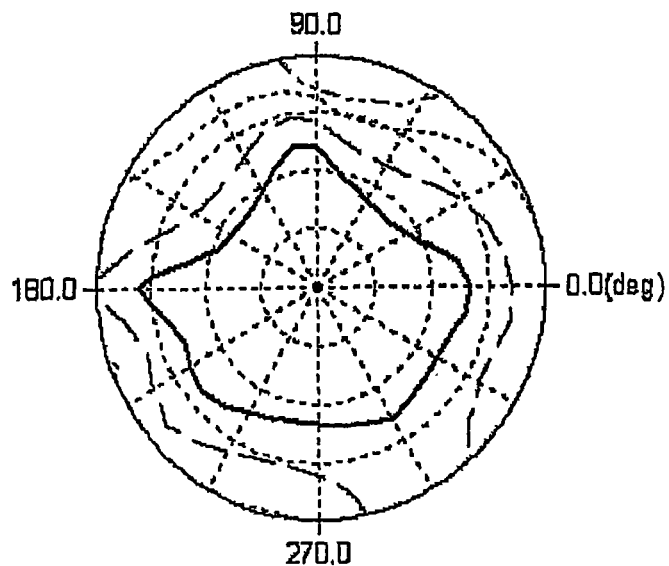
FIG. 12 is a view indicating the contrast ratio when viewing the liquid crystal display device of Example 3 from all the directions.

FIG. 12 shows the contrast ratio from all the directions defined by the transmissivity ratio of white image 0 V and black image 5 V "(white image)/(black image)" when the backlight is on. The concentric circles are drawn to be at an interval of 20 degrees. Therefore, the outermost circle indicates 80 degrees from the center.

It was confirmed from FIG. 12 that the liquid crystal display device had excellent viewing angle characteristics.

Example 4

Figure 13:
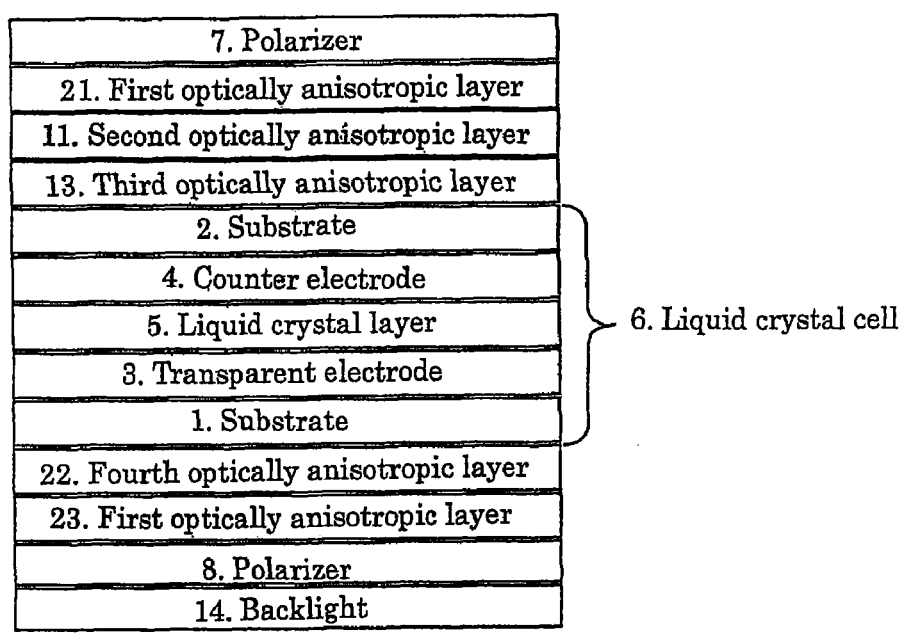
FIG. 13 is a schematic cross-sectional view of the liquid crystal display device of Example 4.

The configuration and axis arrangement of the liquid crystal display device of Example 4 will be described with reference to FIGS. 13 and 14, respectively.

The liquid crystal cell 6 of Example 1 is used. On the side of the substrate 2 opposite to the side on which the counter electrode 4 is formed are arranged a third optically anisotropic layer 13, a second optically anisotropic layer 11, a first optically anisotropic layer 21 and a polarizer 7. On the side of the substrate 1 opposite to the side on which the transparent electrode 3 is formed are arranged a fourth optically anisotropic layer 22, a first optically anisotropic layer 23 and a polarizer 8. A backlight 14 is arranged in the rear of the polarizer 8.

The polarizers 7, 8, the second optically anisotropic layer 11, and the third optically anisotropic layer 13 are the same as those used in Example 1.

The polarizer 7 was disposed on the viewer's side (the upper portion in FIG. 13) of the liquid crystal cell 6. Between the polarizer 7 and the liquid crystal cell 6 were disposed a polymeric stretched film formed of a uniaxially stretched norbornene copolymer film as the first optically anisotropic layer 21, a liquid crystal film as the second optically anisotropic layer 11 and a negative film with Rth=−100 nm produced above as the third optically anisotropic layer 13. The Δnd of the polymeric stretched film 21 was approximately 265 nm while the Δnd of the liquid crystal film 11 with a fixed hybrid nematic orientation was approximately 105 nm.

In the rear of the liquid crystal cell 6 viewed from the viewer were arranged a polymeric stretched film formed of a uniaxially stretched norbornene copolymer film as the fourth optically anisotropic layer 22 and a polymeric stretched film formed of a uniaxially stretched norbornene copolymer film as the first optically anisotropic layer 23, on the back of which the polarizer 8 was arranged. The Δnd of the uniaxially stretched polymeric film 22 was 110 nm while the Δnd of the uniaxially stretched polymeric film 23 was 270 nm.

Figure 14:
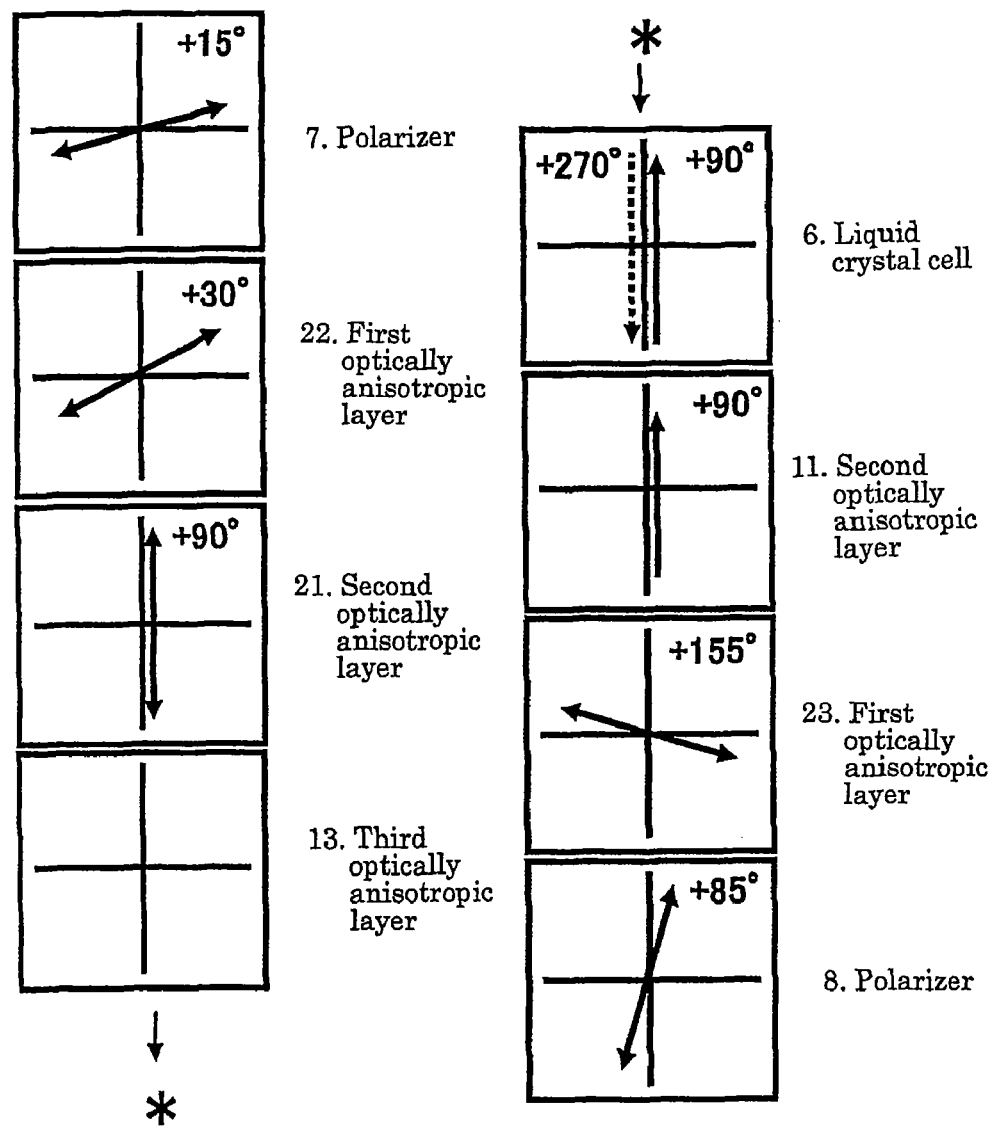
FIG. 14 is a plan view indicating the angular relation of the absorption axes of the polarizers, the pre-tilt direction of the liquid crystal cell, the slow axes of the polymeric stretched films and the tilt direction of the liquid crystal film in Example 4.

The absorption axes of the polarizers 7, 8, the slow axes of the polymeric stretched films 21, 22 and 23, the pre-tilt direction of the liquid crystal cell 6 at both of the interfaces and the tilt direction of the liquid crystal film 11 were oriented as shown in FIG. 14.

Figure 15:
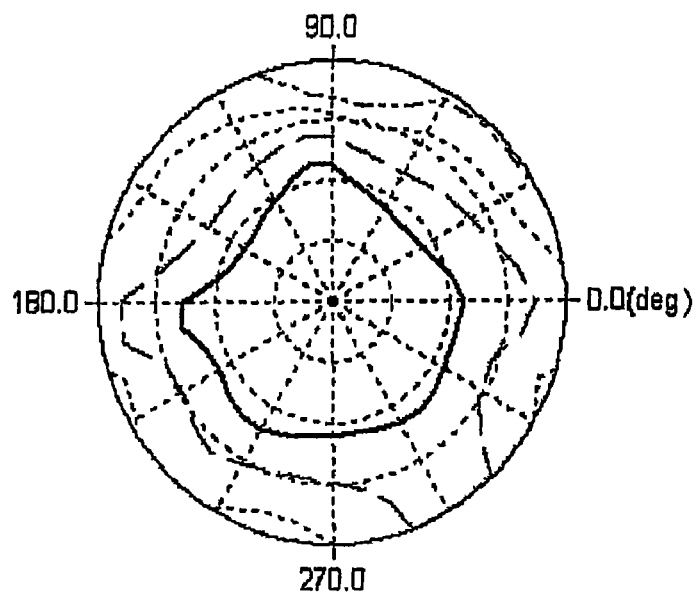
FIG. 15 is a view indicating the contrast ratio when viewing the liquid crystal display device of Example 4 from all the directions.

FIG. 15 shows the contrast ratio from all the directions defined by the transmissivity ratio of white image 0 V and black image 5 V "(white image)/(black image)" when the backlight is on. The concentric circles are drawn to be at an interval of 20 degrees. Therefore, the outermost circle indicates 80 degrees from the center.

It was confirmed from FIG. 15 that the liquid crystal display device had excellent viewing angle characteristics.

Comparative Example 1

Figure 16:
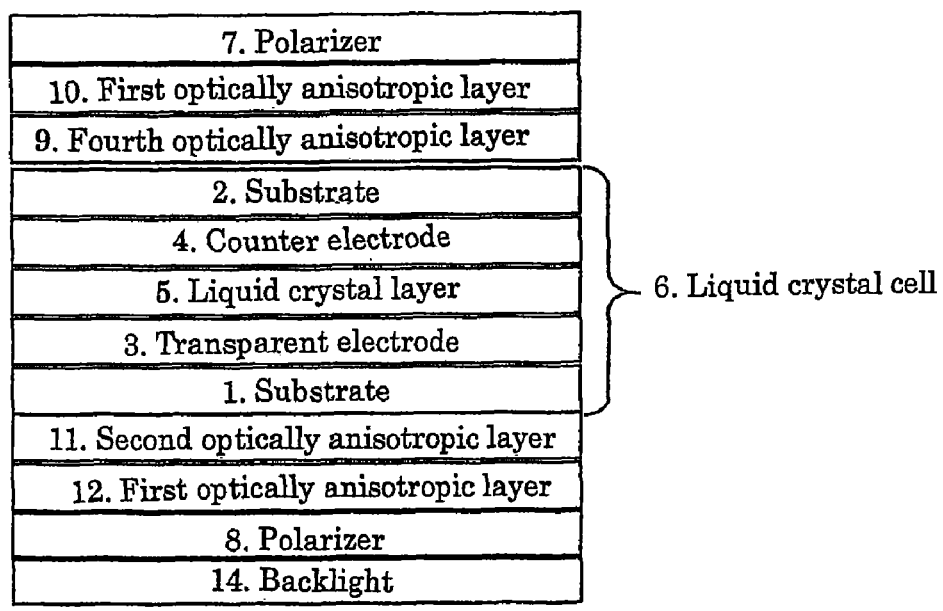
FIG. 16 is a schematic cross-sectional view of the liquid crystal display device of Comparative Example 1.

The configuration of the liquid crystal display device of Comparative Example 1 will be described with reference to FIG. 16.

The liquid crystal display device of this example was produced with the same procedures of Example 1 except that the third optically anisotropic layer 13 was excluded.

Figure 17:
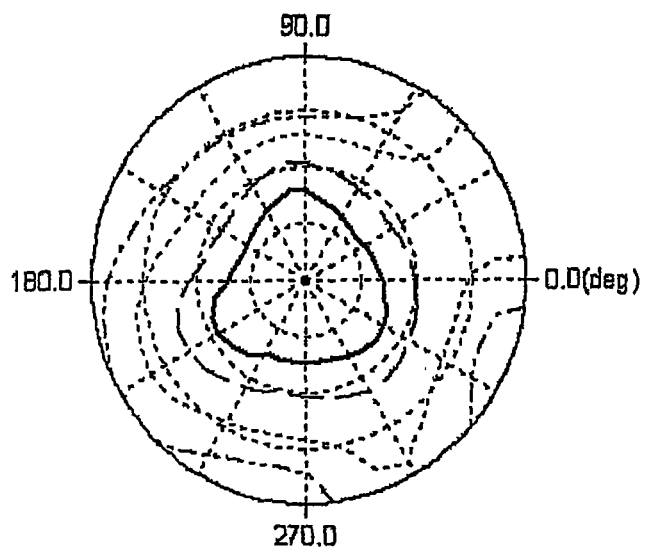
FIG. 17 is a view indicating the contrast ratio when viewing the liquid crystal display device of Comparative Example 1 from all the directions.

FIG. 17 shows the contrast ratio from all the directions defined by the transmissivity ratio of white image 0 V and black image 5 V "(white image)/(black image)" when the backlight is on. The concentric circles are drawn to be at an interval of 20 degrees. Therefore, the outermost circle indicates 80 degrees from the center.

With regard to viewing angle characteristics, Example 1 and Comparative Example 1 are compared.

Comparing the contrast contour lines shown in FIGS. 6 and 17, it is confirmed that viewing angle characteristics are significantly improved using the third optically anisotropic layer 13.

Comparative Example 2

Figure 18:
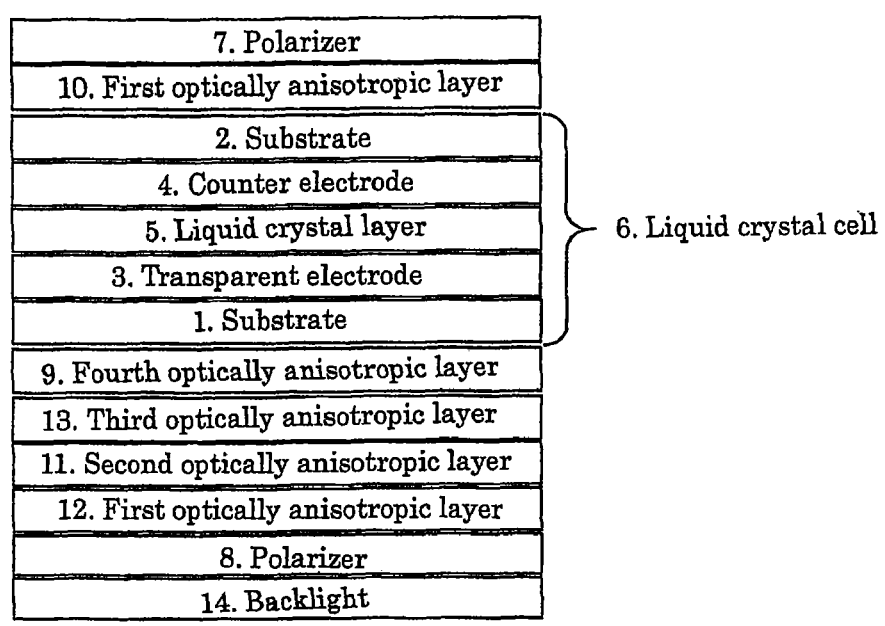
FIG. 18 is a schematic cross-sectional view of the liquid crystal display device of Comparative Example 2.

The configuration of the liquid crystal display device of Comparative Example 2 will be described with reference to FIG. 18.

The liquid crystal display device of this example was produced with the same procedures of Example 1 except that the fourth optically anisotropic layer 9 was shifted from the viewer's side of the liquid cell 6 to the rear side thereof.

However, it was confirmed that contrast was significantly reduced even when the device was viewed from the front and image quality was reduced to an extent that the image was not visible with naked eyes.

Example 5

Figure 19:
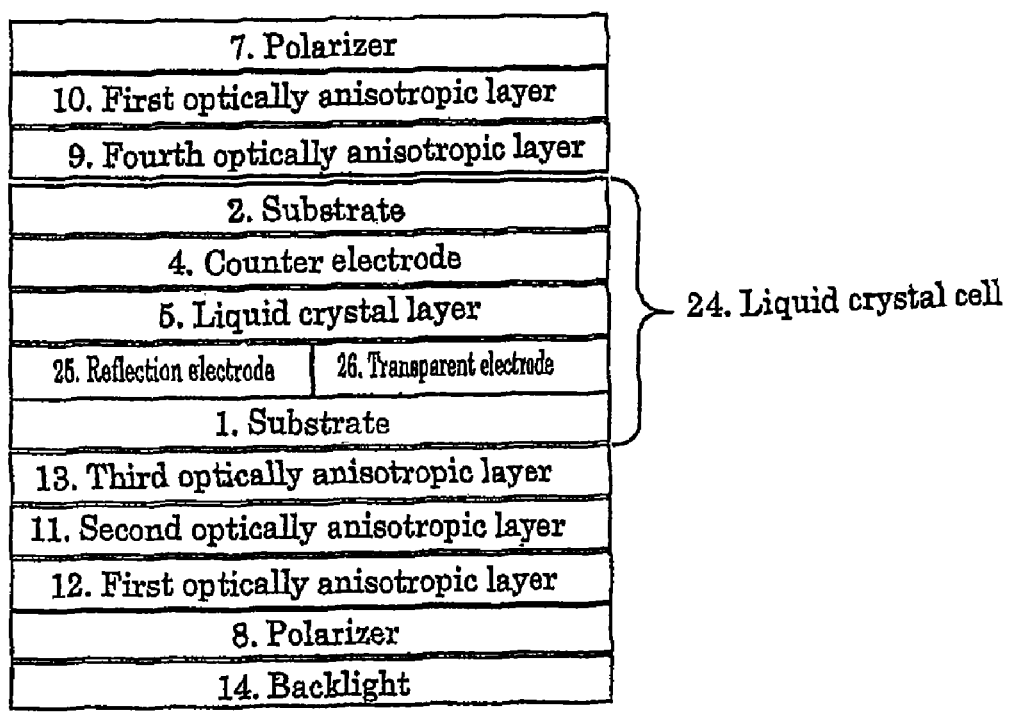
FIG. 19 is a schematic cross-sectional view of the transflective liquid crystal display device of Example 5.

The configuration of the transflective liquid crystal display device of Example 5 will be described with reference to FIG. 19.

The liquid crystal display device of this example are produced with the same procedures of Example 1 except that a liquid crystal cell 24 was used.

On the substrate 1 of the liquid crystal cell 24 were arranged a reflective electrode 25 formed of a highly reflective material such as Al and a transparent electrode 26 formed of a highly transmissive material such as ITO. A liquid crystal layer 5 formed from a liquid crystalline material exhibiting positive dielectric constant anisotropy is sandwiched between the reflective and transparent electrodes 25, 26 and the counter electrode 4.

The liquid crystal layer thicknesses of the liquid crystal cell 24 in the reflective electrode region 25 (reflective display part) and the transparent electrode region 26 (transmissive display part) were set to 2.4 μm and 4.9 μm, respectively. The pre-tilt angle of the liquid crystal layer at both of the substrate interfaces was 2 degrees. The Δnds of the liquid crystal cell in the reflective displaying part and transmissive displaying part are approximately 150 nm and 320 nm, respectively.

With regard to the contour lines from all of the directions, it was confirmed that a similar results to that shown in FIG. 6 was obtained with this device and a transflective liquid crystal display device with a wide viewing angle was able to be produced.

In these examples, the experiments were carried out without using a color filter. Of course, the provision of a color filter in the liquid crystal cell can provide excellent multi-color or full-color images.

APPLICABILITY IN THE INDUSTRY

According to the present invention, there is provided a liquid crystal display device which can provide bright images and is high in front contrast and less in viewing angle dependency.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. A liquid crystal display device comprising at least:
a backlight;
a polarizer;
a first optically anisotropic layer with a retardation of 210 to 300 nm at a wavelength of 550 nm;
a second optically anisotropic layer with a retardation of 50 to 140 nm at a wavelength of 550 nm;
a third optically anisotropic layer with negative optical anisotropy;
a liquid crystal cell comprising upper and lower substrates facing each other and a liquid crystal layer sandwiched between the upper and lower substrates;
a fourth optically anisotropic layer with a retardation of 50 to 140 nm at a wavelength of 550 nm;
a first optically anisotropic layer with a retardation of 210 to 300 nm at a wavelength of 550 nm; and
a polarizer, arranged in piles in this order from the backlight,
the second optically anisotropic layer comprising at least a liquid crystal film with a fixed nematic hybrid liquid crystal orientation structure.

2. The liquid crystal display device according to claim 1, wherein the liquid crystal layer is of a twisted nematic mode.

3. The liquid crystal display device according to claim 1, wherein the liquid crystal layer is of a parallel orientation with a twist angle of 0 degrees.

4. The liquid crystal display device according to claim 1, wherein the third optically anisotropic layer fulfills the requirement set forth in formula (1) and has a plane direction retardation (Re) in the range of 0 nm to 30 nm and a thickness direction retardation (Rth) in the range of −200 nm to −30 nm, both at a wavelength of 550 nm, when (Re) and (Rth) are represented by formulas (2) and (3), respectively:

$$nx \geq ny > nz \quad (1)$$

$$Re = (nx - ny) \times d \quad (2)$$

$$Rth = \{nz - (nx + ny)/2\} \times d \quad (3)$$

wherein nx and ny denote principal indices of plane direction refraction of the optically anisotropic layer, nz denotes a principal index of thickness direction refraction of the optically anisotropic layer, and d denotes the thickness (nm) thereof.

5. The liquid crystal display device according to claim 1, wherein the third optically anisotropic layer is formed from at least one type of material selected from the group consisting of liquid crystalline compounds, triacetyl cellulose, polyamides, polyimides, polyesters, polyether ketones, polyamide imides, and cyclic olefin polymers.

6. The liquid crystal display device according to claim 1, wherein the first and fourth optically anisotropic layers are stretched polymer films.

7. The liquid crystal display device according to claim 1, wherein the first and fourth optically anisotropic layers are each a liquid crystal film produced by fixing a liquid crystalline substance exhibiting an optically positive uniaxiality, in a nematic orientation formed when the substance is in the liquid crystal state.

8. The liquid crystal display device according to claim 1, wherein the angle defined by the tilt direction of the hybrid direction of the liquid crystal film forming the second optically anisotropic layer, projected to a plane and the rubbing direction of the liquid crystal layer is in the range of 0 to 30 degrees.

9. The liquid crystal display device according to claim 1, wherein the second optically anisotropic layer is a liquid crystal film produced by fixing a liquid crystalline substance exhibiting an optically positive uniaxiality, in a nematic hybrid orientation formed when the substance is in the liquid crystal state, and the average tilt angle of the nematic hybrid orientation is in the range of 36 to 45 degrees.

10. The liquid crystal display device according to claim 1, wherein the lower substrate of the liquid crystal cell has a transflective electrode on which a region with a reflective function and a region with a transmissive function are formed.

11. The liquid crystal display device according to claim 10, wherein the thickness of the liquid crystal layer on the region with a reflective function in the liquid crystal cell is smaller than that of the liquid crystal layer on the region with a transmissive function.

12. A liquid crystal display device comprising at least:
a backlight;
a polarizer;
a first optically anisotropic layer with a retardation of 210 to 300 nm at a wavelength of 550 nm;
a second optically anisotropic layer with a retardation of 50 to 140 nm at a wavelength of 550 nm;
a liquid crystal cell comprising upper and lower substrates facing each other and a liquid crystal layer sandwiched between the upper and lower substrates;
a third optically anisotropic layer with negative optical anisotropy;
a fourth optically anisotropic layer with a retardation of 50 to 140 nm at a wavelength of 550 nm;
a first optically anisotropic layer with a retardation of 210 to 300 nm at a wavelength of 550 nm; and
a polarizer, arranged in piles in this order from the backlight,
the second optically anisotropic layer comprising at least a liquid crystal film with a fixed nematic hybrid liquid crystal orientation structure.

13. A liquid crystal display device comprising at least:
a backlight;
a polarizer;
a first optically anisotropic layer with a retardation of 210 to 300 nm at a wavelength of 550 nm;
a fourth optically anisotropic layer with a retardation of 50 to 140 nm at a wavelength of 550 nm;
a third optically anisotropic layer with negative optical anisotropy;
a liquid crystal cell comprising upper and lower substrates facing each other and a liquid crystal layer sandwiched between the upper and lower substrates;
a second optically anisotropic layer with a retardation of 50 to 140 nm at a wavelength of 550 nm;
a first optically anisotropic layer with a retardation of 210 to 300 nm at a wavelength of 550 nm; and
a polarizer, arranged in piles in this order from the backlight,
the second optically anisotropic layer comprising at least a liquid crystal film with a fixed nematic hybrid liquid crystal orientation structure.

14. A liquid crystal display device comprising at least:
a backlight;
a polarizer;
a first optically anisotropic layer with a retardation of 210 to 300 nm at a wavelength of 550 nm;
a fourth optically anisotropic layer with a retardation of 50 to 140 nm at a wavelength of 550 nm;
a liquid crystal cell comprising upper and lower substrates facing each other and a liquid crystal layer sandwiched between the upper and lower substrates;
a third optically anisotropic layer with negative optical anisotropy;
a second optically anisotropic layer with a retardation of 50 to 140 nm at a wavelength of 550 nm;
a first optically anisotropic layer with a retardation of 210 to 300 nm at a wavelength of 550 nm; and
a polarizer, arranged in piles in this order from the backlight,
the second optically anisotropic layer comprising at least a liquid crystal film with a fixed nematic hybrid liquid crystal orientation structure.

* * * * *